United States Patent [19]

Ishida

[11] Patent Number: 4,470,391

[45] Date of Patent: Sep. 11, 1984

[54] AIR-FUEL MIXTURE INTAKE CONSTRUCTION FOR INTERNAL COMBUSTION ENGINES

[75] Inventor: Tokuzi Ishida, Hamamatsu, Japan

[73] Assignee: Suzuki Jidosha Kogyo Kabushiki Kaisha, Shizuoka, Japan

[21] Appl. No.: 347,191

[22] Filed: Feb. 9, 1982

[30] Foreign Application Priority Data

Feb. 27, 1981 [JP] Japan .................................. 56-28190
Mar. 16, 1981 [JP] Japan .................................. 56-37533
Jun. 24, 1981 [JP] Japan .................................. 56-96737

[51] Int. Cl.³ .......................................... F02M 35/10
[52] U.S. Cl. ................................... 123/308; 123/306; 123/432
[58] Field of Search .............. 123/52 M, 52 MB, 302, 123/308, 306, 432, 442, 577, 587, 262, 282, 339; 261/23 B, 23 C

[56] References Cited

U.S. PATENT DOCUMENTS

| | | | |
|---|---|---|---|
| 2,727,502 | 12/1955 | Grillet et al. | 123/52 M |
| 3,977,366 | 8/1976 | Yamaguchi et al. | 123/432 |
| 4,138,974 | 2/1979 | Takemoto et al. | 261/233 |
| 4,253,437 | 3/1981 | Haramoto | 123/339 |
| 4,270,500 | 6/1981 | Nakagawa et al. | 123/308 |

Primary Examiner—Ira S. Lazarus
Assistant Examiner—R. S. Bailey
Attorney, Agent, or Firm—Flynn, Thiel, Boutell & Tanis

[57] ABSTRACT

An air-fuel mixture intake construction for an internal combustion engine comprises a primary intake system for supplying an air-fuel mixture under a full range of engine loads, a secondary intake system for supplying an air-fuel mixture under medium and high engine loads, and an induction passage having one end opening into a secondary intake passage immediately upstream of a secondary throttle valve disposed therein, and the other end opening immediately upstream of an intake valve for a combustion chamber. The open end of the induction passage in the secondary intake passage is spaced inwardly from an inner wall surface of the secondary intake passage to prevent fuel in liquid form from flowing into the induction passage from the secondary intake passage. According to another embodiment, a plurality of induction passages are provided respectively for combustion chambers and connected to a common passage which communicates with primary intake passages immediately downstream of a primary throttle valve and also with a slow fuel supply passageway in the secondary intake system. The induction passages comprise pipes opening into secondary intake passages, respectively, immediately upstream of secondary throttle valves. When the engine operates, the induction passage ejects air or an air-fuel mixture into the combustion chambers at high speeds to thereby form swirls therein for promotion of fuel combustion. With fuel supplied continuously from the slow fuel supply passageway into the induction passage, there is no danger for vapor lock to take place within the slow fuel passageway.

13 Claims, 9 Drawing Figures

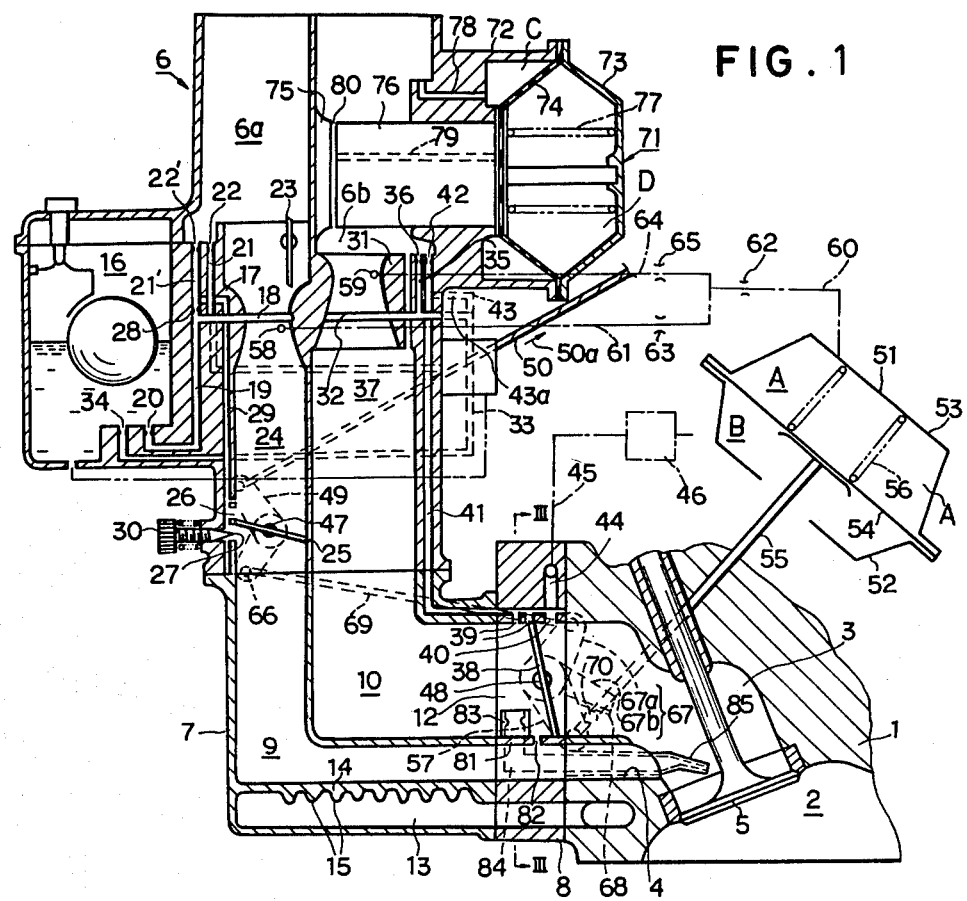
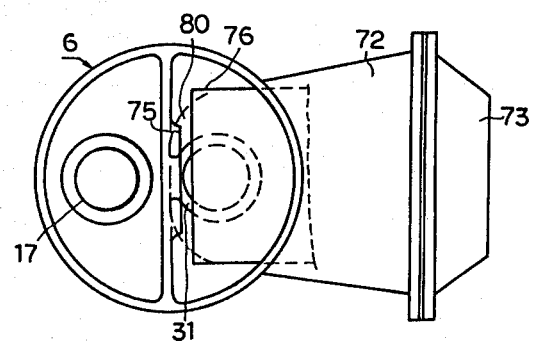
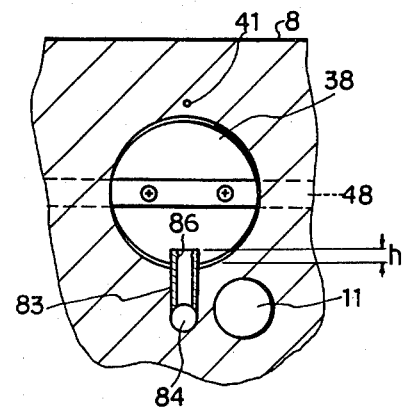

AIR-FUEL MIXTURE INTAKE CONSTRUCTION FOR INTERNAL COMBUSTION ENGINES

BACKGROUND OF THE INVENTION

1. Field of the Invention:

The present invention relates to an air-fuel mixture intake construction having a two-barrel or duplex carburetor for internal combustion engines, the intake construction including an induction passage for producing air-fuel mixture swirls in combustion chambers on intake stroke.

2. Prior Art:

There have been known and practiced two-barrel carburetors comprising a primary intake system for supplying an air-fuel mixture under a full range of engine loads and a secondary intake system for supplying an air-fuel mixture under medium and high engine loads to promote fuel atomization under low engine loads and prevent power reduction under the medium and high engine loads.

Many proposals have been made to cause flames to spread at higher speeds in combustion chambers in such an internal combustion engine. One such proposed structure comprises an induction passage or pipe for ejecting air or an air-fuel mixture into the combustion chamber at a high speed to form swirls therein. The induction passage opens at one end into a secondary intake passage upstream of a secondary throttle valve so as to introduce therein air or an air-fuel mixture from the secondary intake passage. There has been a tendency, however, for fuel in liquid form flowing down the secondary intake passage to find its way into the induction passage, from which such liquid fuel enters the combustion chamber. Therefore, the air-fuel mixture in the combustion chamber becomes too rich with the result that unburned components or hydrocarbons will be produced and discharged. Furthermore, as the primary and secondary throttle valves open more widely, the amount of air or an air-fuel mixture ejected through the induction passage is decreased, resulting in a reduction in the rate at which frames spread in the combustion chamber when the engine operates under medium and high loads. This also allows unburned hydrocarbons to be discharged.

Multiple-cylinder engines include an intake manifold for distribution an air-fuel mixture from a single carburetor among the multiple cylinders. The intake manifold is made of cast metal and hence has its branch surfaces roughened to various degrees. The manifold branches exhibit different resistances to the flow of an air-fuel mixture passing therethrough. Such different resistances are partly attributable to uneven distribution of air-fuel mixture among the engine cylinders especially when the amount of air-fuel mixture required is small in an idling or low-load mode of operation of the engine.

Air-fuel mixture intake constructions with primary and secondary intake systems have a secondary slow fuel supply passage for supplying fuel to enable smooth engine operation when the secondary intake system comes into operation. During normal engine operation, the primary intake system is mainly in operation, and the secondary slow fuel passage tends to be subjected to vapor lock, with the consequence that the engine will undergo hesitation and impair drivability. To cope with this problem, various proposals have been made in which a portion of fuel in the secondary slow fuel passage is drawn at all times into the primary intake passage or introduced into the secondary intake passage downstream of the secondary throttle valve. The amount of fuel which is quite small is however rendered unstable or varied under the influences of pulsating engine operation and high negative pressure in the intake passages while the engine operates under low loads, a disadvantage which prohibits smooth engine operation.

SUMMARY OF THE INVENTION

An air-fuel mixture intake construction for an internal combustion engine comprises a primary intake system for supplying an air-fuel mixture under a full range of engine loads, a secondary intake system for supplying an air-fuel mixture under medium and high engine loads, and an induction passage having one end opening into a secondary intake passage immediately upstream of a secondary throttle valve, and the other end opening immediately upstream of an intake valve for a combustion chamber of the engine. The open end of the induction passage in the secondary intake passage is spaced inwardly from an inner wall surface of the secondary intake passage so that fuel in liquid phase flowing down the latter will be prevented from entering the induction passage. According to another embodiment, a plurality of induction passages are provided respectively for multiple engine cylinders and have distal ends opening immediately upstream of intake valves for the engine cylinders. The induction passages are connected at the other ends to a common passage which communicates with primary intake passages immediately downstream of a primary throttle valve and which also communicates with a slow fuel supply passage in the secondary intake passage. The induction passages comprise pipes opening into the secondary intake passages immediately upstream of the secondary throttle valves. When the engine operates, the induction passages eject air or an air-fuel mixture into the combustion chambers to produce swirls therein for promoting or speeding up fuel combustion. The amount of air or an air-fuel mixture which is discharged through the induction passages into the combustion chambers is rendered substantially constant irrespective of varying engine operating conditions. With fuel supplied from the slow fuel supply passgeway into the induction passages, the engine cylinders can be fed with equal amounts of fuel in an idle or low-load mode of operation.

It is an object of the present invention to provide an air-fuel mixture intake construction including an induction passage which is protected against an influx of fuel in liquid form thereinto.

Another object of the present invention is to provide an air-fuel mixture intake construction having an induction passage capable of ejecting an amount of air or air-fuel mixture which is substantially constant irrespective of various engine operating conditions.

Still another object of the present invention is to provide an air-fuel mixture intake construction for supplying an air-fuel mixture distributed uniformly among engine cylinders while the engine operates in an idle mode or under low loads.

A still further object of the present invention is to provide an air-fuel mixture intake construction for supplying a constant amount of fuel when the amount of fuel supplied is quite small, and for enabling an engine to operate smoothly when a secondary intake system comes into operation so that improved drivability will be ensured.

The above and other objects, features, and advantages of the present invention will become more apparent from the following description when taken in conjunction with the accompanying drawings in which some preferred embodiments are shown by way of illustrative example.

BRIEF DESCRIPTION OF THE DRAWINGS

FIG. 1 is a vertical cross-sectional view of an air-fuel mixture intake construction according to the present invention;

FIG. 2 is a plan view of a carburetor in the air-fuel mixture intake construction shown in FIG. 1;

FIG. 3 is a cross-sectional view taken along line III-III of FIG. 1;

DESCRIPTION OF THE PREFERRED EMBODIMENTS

Figure 4:
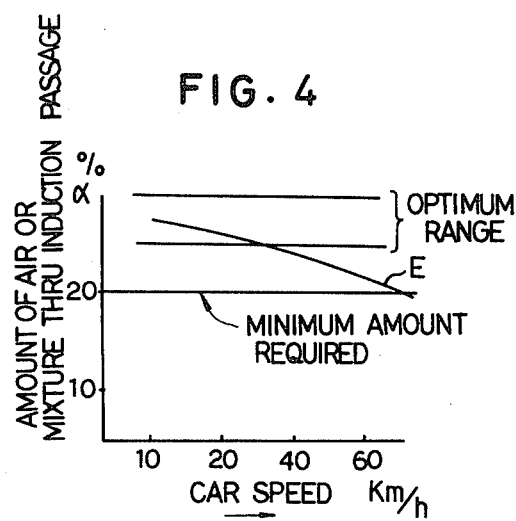
FIG. 4 is a graph showing amounts of air or air-fuel mixture ejected from an induction passage, plotted against car speeds.

As shown in FIG. 1, an internal combustion engine for a motor vehicle such as an automobile comprises a cylinder head 1, a combustion chamber 2, a secondary intake port 3 and a primary intake port 4 which are defined in the cylinder head 1, and an intake valve 5 reciprocably movably mounted in the cylinder head 1 for opening and closing the secondary intake port 3 with respect to the combustion chamber 2, the primary intake port 4 opening into the secondary intake port 3 immediately upstream of the intake valve 5 with respect to the direction of flow of an air-fuel mixture into the combustion chamber 2.

An air-fuel mixture intake construction according to the present invention comprises a two-barrel or duplex carburetor 6, an intake manifold 7 connected thereto, and an adapter 8 interposed between branches of the intake manifold 7 and the cylinder head 1. Each of the manifold branches communicates with one of combustion chambers through the primary and secondary intake ports 4, 3. Each branch of the manifold 7 includes a primary intake passageway 9 and a secondary intake passageway 10. The adapter 8 has a primary intake passageway 11 coupled between the primary passageway 9 and the primary intake port 4, and a secondary intake passageway 12 coupled between the secondary passageway 10 and the secondary intake port 3. A coolant water channel 13 is defined continuously through the intake manifold 7, the adapter 8, and the cylinder head 1. The intake manifold 7 includes a partition 14 between the primary intake passageway 9 and the coolant channel 13, the partition 14 having radiation fins 15 extending therefrom into the coolant channel 13.

The two-barrel carburetor 6 has a float chamber or bowl 16. The carburetor 6 is composed of a primary fuel supply system and a secondary fuel supply system.

The primary fuel supply system includes a primary main fuel supply subsystem and a primary slow fuel supply subsystem. The primary fuel supply subsystem comprises a venturi 17, a main nozzle 18 disposed in the venturi 17, a fuel well 19 connected between the main nozzle 18 and a bottom of the float chamber 16, a main jet 20 in the fuel well 19 at its end opening into the float chamber 16, a passage 21 communicating between the main nozzle 18 and a passgeway 6a leading to an air cleaner (not shown), and a main air jet 22 in the passage 21.

The carburetor 6 includes a choke valve 23 positioned upstream of the main nozzle 18, an intake passageway 24 extending from the primary venturi 17 downstream of the main nozzle 18, and a primary throttle valve 25 mounted in the intake passageway 24.

The primary slow fuel supply subsystem comprises bypass ports 26 opening immediately upstream of the throttle valve 25, an idle port 27 opening immediately downstream of the throttle valve 25, a passage 21' communicating with the idle port 27, the fuel well 19, and the passageway 6a, a slow jet 28 located in the passage 21', a slow air jet 22' disposed in the passage 21' at its end opening into the passageway 6a, a passage 29 communicating with the bypass port 26, the idle port 27, and the passage 21', and a screw 30 for adjusting the opening of the idle port 27.

The intake passageways 24, 9, 11 and the intake port 4 jointly constitute a primary intake passage extending between the venturi 17 and the secondary intake port 3.

The secondary fuel supply system also has a secondary main fuel supply subsystem and a secondary slow fuel supply subsystem. The secondary main fuel supply subsystem comprises a venturi 31, a main nozzle 32 mounted in the venturi 31, a fuel well 33 connected between the main nozzle 32 and the bottom of the float chamber 16, a main jet 34 in the fuel well 33 at its end opening into the float chamber 16, a passage 35 communicating between the main nozzle 32 and a passageway 6b extending from the air cleaner upwardly of the venturi 31, and a main air jet 36 disposed in the passage 35 at its end facing the passageway 6b.

The carburetor 6 also includes an intake passageway 37 extending from the venturi 31 downstream of the main nozzle 31, and a secondary throttle valve 38 mounted in the intake passageway 12 in the adapter 8.

The secondary slow fuel supply subsystem comprises bypass ports 39 opening immediately upstream of the throttle valve 38, an idle port 40 opening immediately downstream of the throttle valve 28, a slow fuel passage 41 extending in communication between the bypass ports 39 and the idle port 40 and the passageway 6b, a main air jet 42 located in the passageway 41 at its end opening into the passageway 6b, a passage 43 connected between the fuel well 33 and the passage 41, and a slow jet 43a disposed in the passage 43.

The intake passageways 37, 10, 12 and the intake port 3 jointly constitute a secondary intake passage extending between the venturi 31 and the combustion chamber 2.

The adapter 8 has an exhaust introduction port 44 held in communication with the idle port 40 and connected through a passageway 45 to an exhaust pipe (not shown), the passageway 45 supporting therein an EGR value 46. The throttle valve 25 is supported on a throttle shaft 47. The throttle valve 38 is supported on a throttle shaft 48. A lever 49 is fixed to the throttle shaft 47 and connected by a connector wire 50 to an accelerator pedal (not illustrated).

The secondary throttle valve 38 is controlled for its opening and closing motion by a vacuum-operated actuator 51. The vacuum-operated actuator 51 comprises a body or housing 52, a cover 53 mounted on the body 52, a diaphragm 54 sandwiched between the body 52 and the cover 53, a rod 55 affixed endwise to the diaphragm 54, and a compression coil spring 56 interposed between the disphragm 54 and the cover 53. The cover 53 and the diaphragm 54 jointly define therebetween a vacuum chamber A, and the diaphragm 54 and the body 52 jointly define therebetween a chamber B vented to the atmosphere.

The rod 55 is pivotably mounted on a distal end of a lever 57 secured for corotation to the throttle shaft 48. A primary vacuum pickup port 58 opens into the venturi 17, and a secondary vacuum pickup port 59 opens into the venturi 31. The primary vacuum pickup port 58 communicates with the vacuum chamber A via passageways 60, 61 and orifices 62, 63 respectively therein, and the secondary vacuum pickup port 59 communicates also with the vacuum chamber A via passageways 60, 64 and orifices 62, 65 respectively therein. When the primary throttle valve 25 opens substantially fully, the actuator 51 is actuated under a vacuum developed in the vacuum pickup port 58 to open the secondary throttle valve 38.

The secondary throttle valve 38 is limited in its opening motion by a link mechanism operatively coupled with the primary throttle valve 25. The link mechanism comprises a lever 66 mounted on the throttle shaft 47, a lever 67 having a pair of lever portions 67a, 67b and rotatably supported on the throttle shaft 48, a bent portion 68 integral with the lever portion 67b, and a connector rod 69 connected between the lever 66 and the lever portion 67a. A limit pin 70 projects from an end of the lever 57. As the lever 57 angularly moves counterclockwise, the limit pin 70 also moves until it abuts against the bent portion 68 whereupon the lever 57 and hence the throttle valve 38 are prevented from opening further.

A variable valve 71 is mounted on the carburetor 6 upstream of the secondary venturi 31 and openable under a vacuum developed in the passageway 6b by the secondary venturi 31. The variable valve 71 comprises a projection 72 extending laterally from the carburetor 6, a cover 73 attached to the projection 72, a diaphragm 74 sandwiched between the projection 72 and the cover 73, a land 75 projecting laterally into the passageway 6b toward the projection 72, a piston 76 supported on the diaphragm 74 and movable toward and away from the land 75, and a compression coil spring 77 interposed beteen the cover 73 and the diaphragm 74. The projection 72 and the diaphragm 74 jointly define therebetween a chamber C vented to the atmosphere, and the diaphragm 74 and the cover 73 jointly define therebetween a vacuum chamber D. The atmospheric chamber C communicates with the passageway 6b through a passageway 78 defined through the projection 72. The vacuum chamber D is held in communication through a hole 79 defined in the piston 76 with a variable venturi 80 defined between the piston 76 and the land 75, as shown in FIGS. 1 and 2.

The intake passageways 11, 12 in the adapter 8 are separated by a partition 81 having therethrough a hole 82 which provides communication between the intake passageways 11, 12 immediately upstream of the throttle valve 38.

An induction passage communicates between the secondary intake passageway 12 immediately upstream of the throttle valve 38 and the secondary intake port immediately upstream of the intake port 3. The induction passage comprises a vertical pipe 83 extending into the intake passageway 12 immediately upstream of the throttle valve 38, an intermediate passageway 84 defined in the adapter 8, and a horizontal pipe 85 mounted in the cylinder head 1. The vertical pipe 83 has a jet or orifice 86 therein and an open end spaced by a distance of h (FIG. 3) inwardly from an inner wall surface of the intake passageway 12. The horizontal pipe 85 has a constricted open end or nozzle which is directed roughly along the intake ports 3, 4 toward the combustion chamber 2 substantially tangentially to the circumference of the latter. The induction passage is provided for each of the combustion chambers of the internal combustion engine.

Operation of the air-fuel mixture intake construction will now be described.

When the engine operates in an idling mode, the primary throttle valve 25 and the secondary valve 38 are fully closed. A high vacuum is developed at the idle ports 27, 40, the hole 82, and the induction pipe 85 on intake stroke during the idling mode of operation.

As a result, fuel which is supplied from the float chamber 16 via the main jet 34 into the fuel well 33 is drawn into the passage 41 through the passage 43 and the slow jet 43a. At the same time, air is fed from the air cleaner through the slow air jet 42 into the passage 41. The fuel and air thus supplied into the passage 41 are mixed together therein, and atomized and ejected through the idle port 40 into the secondary intake passageway 12 downstream of the secondary throttle valve 38. The ejected air-fuel mixture is introduced through the secondary intake port 3 into the combustion chamber 2 as the intake valve 5 is unseated upon intake stroke of the engine.

Fuel that is supplied from the float chamber 16 via the main jet 29 into the fuel well 19 is also drawn into the passage 29 via the passage 21' and the slow jet 28. Simultaneously, air from the air cleaner is also introduced into the passage 29 through the slow air jet 22' and the passage 21'. The fuel and air are mixed in the passage 29 and ejected as atomized through the idle port 27 into the primary intake passageway 24 downstream of the primary throttle valve 25. The ejected air-fuel mixture goes through the intake passageways 9, 11 and the intake port 4 into the combustion chamber 2 at a high speed tangentially to its circumference upon intake stroke of the engine. As the air-fuel mixture passes through the intake passageway 11, it is further stirred and atomized by a stream of air drawn from the secondary intake passage 12 through the hole 82 into the primary intake passageway 11.

A vacuum developed at the induction pipe 85 causes air or a lean air-fuel mixture to flow through the venturi 31 and the intake passageways 37, 10, 12 into the pipe 83, the passageway 84, and the pipe 85, from which the air or air-fuel mixture is ejected rapidly into the combustion chamber 2 circumferentially thereof in the direction in which the air-fuel mixtures are fed from the intake ports 3, 4. During the idling mode of operation, the air or air-fuel mixture ejected from the pipe 85 produces strong swirls in the air-fuel mixture within the combustion chamber 2 upon intake stroke.

UNDER LIGHT LOADS

When the accelerator pedal is depressed, the wire 50 is pulled in the direction of the arrow 50a (FIG. 1) to turn the lever 49 clockwise about the throttle shaft 47, opening the primary throttle valve 25. A vacuum now develops in the primary venturi 17, and air is drawn from the air cleaner through the venturi 17 toward the primary throttle valve 25. The vacuum in the venturi 17 causes fuel in the fuel well 19 to be introduced into the main nozzle 18 and also causes air to be fed via the main air jet 22 and the passage 21 into the main nozzle 18. The fuel and air thus supplied into the main nozzle 18 are atomized as they are ejected through the main nozzle 18 into the primary venturi 18, in which the atomized fuel is further mixed with air from the air cleaner. The air-fuel mixture thus formed is introduce via the intake passageways 24, 9, 11 and the intake port 4 into the combustion chamber 2 cicumferentially thereof. The amount of the air-fuel mixture going into the combustion chamber 2, and the speed at which such air-fuel mixture flows into the combustion chamber 2 become greater as the primary throttle valve 25 opens more widely. Air is also ejected from the secondary intake passageway 12 into the primary intake passageway 11 through the hole 82 to promote atomization of the air-fuel mixture flowing through the intake passageway 11. At the same time, the induction pipe 85 ejects air or a lean air-fuel mixture into the combustion chamber 2 to assist the air-fuel mixture in generating swirls in the combustion chamber 2.

The vacuum developed in the primary venturi 17 is introduced through the vacuum pickup port 58, the passageway 61, the orifices 63, 62, and the passageway 60 into the vacuum chamber A in the vacuum-operated actuator 51. The introduced vacuum, however, is too small to overcome the resiliency of the compression coil spring 56, so that the vacuum-operated actuator 51 remains inactivated.

UNDER MEDIUM AND HIGH LOADS

As the primary throttle valve 25 is opened to a larger extent to enable the engine to meet medium and high loads, the speed of flow of the fluid through the primary venturi 17 becomes higher to allow a greater vacuum to develop at the vacuum pickup port 58. When the vacuum thus developed is increased upon continued opening of the primary throttle valve 25 to the point where the vacuum overcomes the force of the compression coil spring 56, the diaphragm 54 is caused by the vacuum in the vacuum chamber A to move toward the cover 53 against the bias of the coil spring 56, enabling the rod 55 to turn the lever 57 and hence the secondary throttle valve 38 counterclockwise, whereupon the secondary throttle valve 38 is opened.

When the secondary throttle valve 38 thus opens, air flows from the air cleaner to develop a vacuum in the intake passageways 10, 37 and the variable venturi 80. The vacuum in the variable venturi 80 is introduced through the passageway 79 into the vacuum chamber D, tending to displace the diaphragm 74 rightward (FIG. 1) against the force of the compression coil springs 77.

The piston 76 of the variable valve 71 starts moving only when the pressure in the vacuum chamber D reaches a predetermined level. As the vacuum is transmitted into the vacuum chamber D through the passageway 79 which is relatively small in diameter, a slight time delay will be exprienced before a required vacuum is developed in the vacuum chamber D after a predetermined vacuum has acted on the variable venturi 80. Furthermore, the vacuum must overcome the inertia of the piston 76 before the latter starts moving to the right as shown in FIG. 1. Therefore, the vacuum valve 71 and hence the variable venturi 80 will start opening a small interval of time after a predetermined degree of vacuum has developed in the variable venturi 80.

Before the vacuum in the intake passageways 10, 37 reaches a predetermined level, the vacuum in the primary intake passageways is lowered to the extent where fuel atomization becomes insufficient resulting in an inadequate air-fuel mixture supplied through the primary intake passageways. However, the variable valve 71 remains only slightly open for a certain interval of time after the vacuum in the intake passageways 10, 37 has reached a predetermined level, with the result that almost no air is introduced from the air cleaner into the venturi 31 and fuel is ejected as atomized into the venturi 31 through the main nozzle 32. The inadequate air-fuel mixture in the primary intake passageways, which is produced when the secondary fuel supply system comes into operation, is compensated for by such a fuel flow supplied from the venturi 31 and mixed with the primary air-fuel mixture in the intake port 3. Thus, an adequate air-fuel mixture is fed into the combustion chamber 2.

When the secondary fuel supply system starts to operate, therefore, it provides a choke effect on the air-fuel mixture, and prevents the air-fuel mixture from getting lean temporarily due to retarded fuel supply under transient engine operating conditions. The engine operates smoothly at the beginning of operation of the secondary feul supply system. Fuel atomization is also improved for stable combustion in the combustion chamber 2.

As the vacuum in the variable venturi 80 becomes increased when the throttle valve 38 opens more widely, the variable venturi 80 opens to a larger degree in response to actuation of the piston 76. Air is allowed to flow through the venturi 31 in an amount which depends on the opening of the variable venturi 80, whereupon an air-fuel mixture is formed in the venturi 31 and fed into the combustion chamber 2. At the same time, the air-fuel mixture is introduced through the induction pipe 85 into the combustion chamber 2, in which swirls are generated for promoting fuel combustion.

As the primary throttle valve 25 opens more widely, the lever 66 angularly moves therewith clockwise, causing the rod 69 to turn the lever 67 counterclockwise about the throttle shaft 48. Such angular movement of the lever 67 causes the bent portion 68 to move away from the limit pin 70. The secondary throttle valve 38 is now allowed to turn counterclockwise by the vacuum-operated actuator 51 until the limit pin 70 abuts against the bent portion 68. Thus, the secondary throttle valve 38 as it is forced open by the vacuum-operated actuator 51 is governed for its opening motion by the primary throttle valve 25.

During deceleration, fuel in liquid form which flows down the secondary intake passageways 37, 10, 12 is prevented from entering the pipe 83 due to the elevated open end thereof, but is ejected through the hole 82 into the primary intake passageway 11 at a high speed, in which the fuel is mixed with the air-fuel mixture flowing through the primary intake passageways, and is atomized.

As illustrated in FIG. 4, the amount E of air or air-fuel mixture which is ejected from the induction pipe 85 into the combustion chamber 2 becomes lowered as the car speed is increased, that is, as the engine load is increased. However, the amount E is well above the minimum limit while the engine operates under medium and high loads.

With the arrangement of the illustrated embodiment, fuel in liquid form is prevented from flowing into the induction passage an hence the combustion chamber, so that production of unburned gasoline or hydrocarbons is prevented. The jet or orifice 86 in the induction passage may be adjusted in cross section to allow an adequate amount of air or air-fuel mixture to flow therethrough during an idling mode of operation and also to allow a minimum amount of air or air-fuel mixture to flow therethrough while the engine operates in a practical range of loads.

Figure 5:
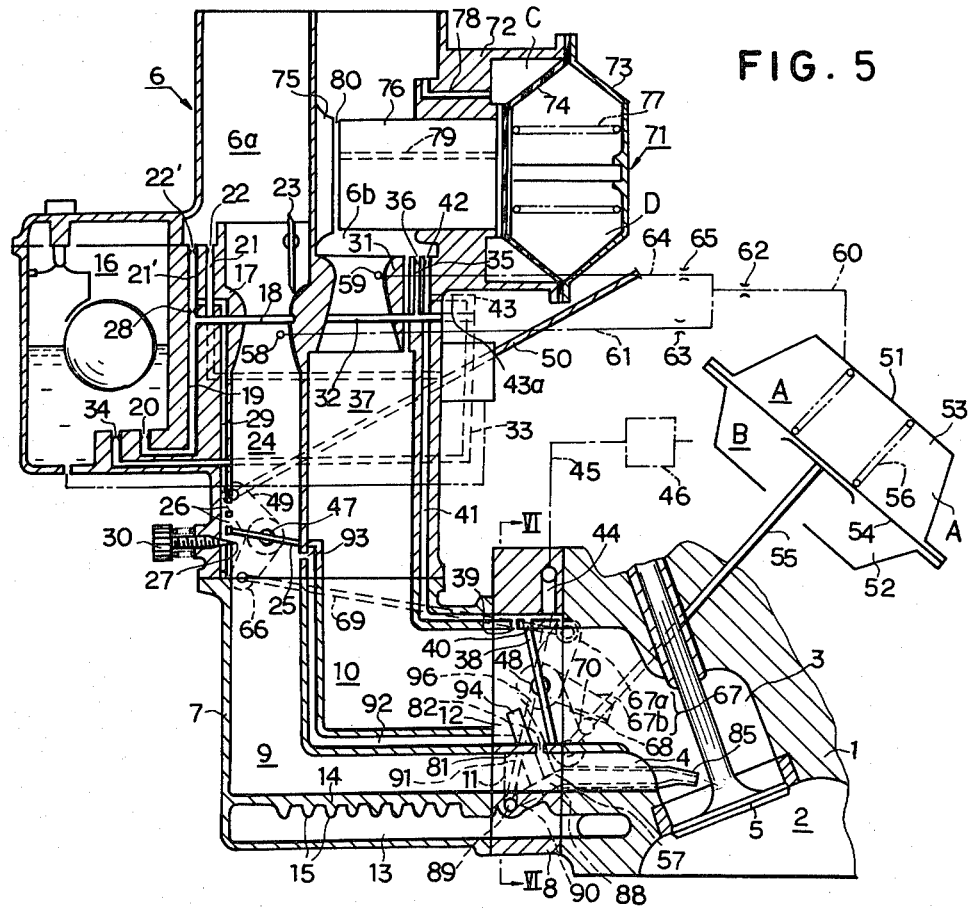
FIG. 5 is a vertical cross-sectional view of an air-fuel mixture intake construction according to another embodiment of the present invention.
Figure 6:
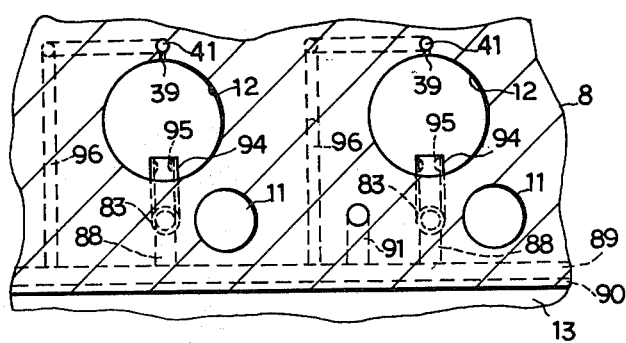
FIG. 6 is a cross-sectional view taken along line VI-VI of FIG. 5.
Figure 7:
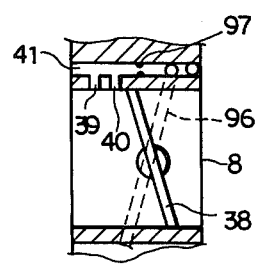
FIG. 7 is an enlarged fragmentary cross-sectional view of a secondary intake passage, where a secondary throttle valve is disposed, of the air-fuel mixture intake construction shown in FIG. 5.

FIGS. 5, 6, and 7 illustrate an air-fuel mixture intake construction according to another embodiment of the present invention. Identical or corresponding parts in FIGS. 5, 6, and 7 are denoted by identical or corresponding reference characters in FIGS. 1 through 3, and will not be described.

An induction passage is provided for each engine cylinder and comprises a horizontal pipe 85 mounted in the cylinder head 1 and having a constricted nozzle opening in the intake port 3 immediately upstream of the intake valve 5. The pipe 85 is connected at an end remote from the nozzle to a passageway 88 defined in the adapter 8. The adapter 8 also has a common passage 89 to which each passageway 88 is connected, as best shown in FIG. 6, the common passage 89 extending across the engine cylinders and disposed adjacent to the coolant channel 13. The common passage 89 and the coolant channel 13 are separated by a partition 90 which is thinner than the partition 14, as shown in FIG. 5.

The adapter 8 includes a vertical passageway 91 which communicates with a passageway 92 defined in the intake manifold 7 and extends up to a position near the primary throttle valve 25, where the passageway 92 communicates with the primary intake passageway 24 via a hole 93 immediately downstream of the throttle valve 25.

The induction passage has a pipe 94 connected to each passageway 88 and projecting upwardly into each of the secondary intake passageways 12 immediately upstream of the secondary throttle valve 38, the pipe 94 having a jet or orifice 95 in its open end as best shown in FIG. 6.

The common passage 89 is held in communication with the passages 41 downstream of the bypass ports 39 through passageways 96 defined in the adapter 8. As shown in FIG. 7, each passage 41 has a metering orifice 97 disposed between the bypass port 40 and the opening of the passageway 96 into the passage 41.

When the engine operates in an idle mode, a vacuum is developed in the pipe 85 to cause the air-fuel mixture to flow from the passage 41 through the orifice 97, the passageway 96, the common passage 89 into the passageway 88. Air or a lean air-fuel mixture is caused under the vacuum in the induction pipe 85 to flow through the variable venturi 80, the passageway 6b, the venturi 31, the passageways 37, 11, 12, and the pipe 94 into the passageway 88, in which it is mixed with the air-fuel mixture fed from the passage 41. The air-fuel mixture is now supplied via the induction pipe 85 into the combustion chamber 2 at a high speed in the direction in which the air-fuel mixture flows from the intake port 4. Accordingly, swirls are generated in the air-fuel mixture within the combustion chamber 2 upon intake stroke.

When the engine operates under light loads, a portion of the air-fuel mixture flowing past the primary throttle valve 25 is introduced through the hole 93, the passageways 92, 91, and the common passage 89 into the passageway 88, in which the air-fuel mixture is further mixed with the air or lean air-fuel mixture supplied via the pipe 94 and also with the fuel from the passage 41. The resultant air-fuel mixture is ejected from the induction pipe 85 circumferentially into the combustion chamber 2, forming swirls in the combustion chamber 2. As the amount of air-fuel mixture flowing in from the hole 93 remains substantially unchanged irrespective of the opening of the throttle valve 25, the amount of air-fuel mixture which is ejected from the induction pipe 85 is also kept substantially constant even if the engine load varies.

As the secondary throttle valve 38 opens while the engine is operating under medium and high loads, a portion of the air-fuel mixture which flows past the throttle valve 38 is introduced from the pipe 94 into the passageway 88, in which the air-fuel mixture is mixed with the air-fuel mixture fed from the primary side via the passageways 91, 92. The combined air-fuel mixture is ejected from the induction pipe 85 into the combustion chamber 2, in which swirls are generated in the air-fuel mixture.

The induction passage is thus supplied with air or air-fuel mixture from the intake passageways downstream of the primary throttle valve and upstream of the secondary throttle valve, and hence ejects an air-fuel mixture into the combustion chamber in an amount which is substantially constant irrespective of varying engine operating conditions. As a consequence, the speed at which flames spread in the combustion chamber is prevented from being lowered while the engine operates under medium and high loads, and the amount of unburned hydrocarbons produced is reduced.

With fuel supplied from the secondary slow fuel supply subsystem into the induction passages for the engine cylinders, fuel can be fed to the cylinders uniformly when the engine is in idle and low-load modes of operation. Uniform fuel supply promotes fuel atomization during the idle and low-load modes of engine operation. Stable fuel combustion is possible with an air-fuel raio on the lean side, resulting in a reduction in the amount of harmful pollutants in the exhaust gas and improved fuel economy or lowered fuel consumption.

The slow fuel supply passageways and the induction passages have inner surfaces machined to a smooth finish such that they supply an air-fuel mixture under balanced pressure and uniformly distribute the air-fuel mixture among the engine cylinders for stable fuel combustion. No special devices such as a throttle positioner, a dash pot, a coasting richer, or the like are required to provide against continuous coasting as the arrangement of the invention can supply an adequate air-fuel mixture so that the catalyst will be prevented from being burned up and the amount of pollutants discharged is reduced.

Since the common passage 89 is located adjacent to the coolant channel 13, fuel in the common passage 89 is heated thereby for promoted fuel atomization. The thin partition 90 between the common passage 89 and the coolant channel 13 allows efficient heat transfer to the induction passage, so that the air-fuel mixture to be ejected into the combustion chamber 2 can highly be atomized in the induction passage.

The orifice 97 may be adjusted in diameter to control the amount of fuel to be fed into the induction passage for pollutant reduction, stable fuel combustion, and hence increased fuel economy and smooth engine operation.

Figure 8:
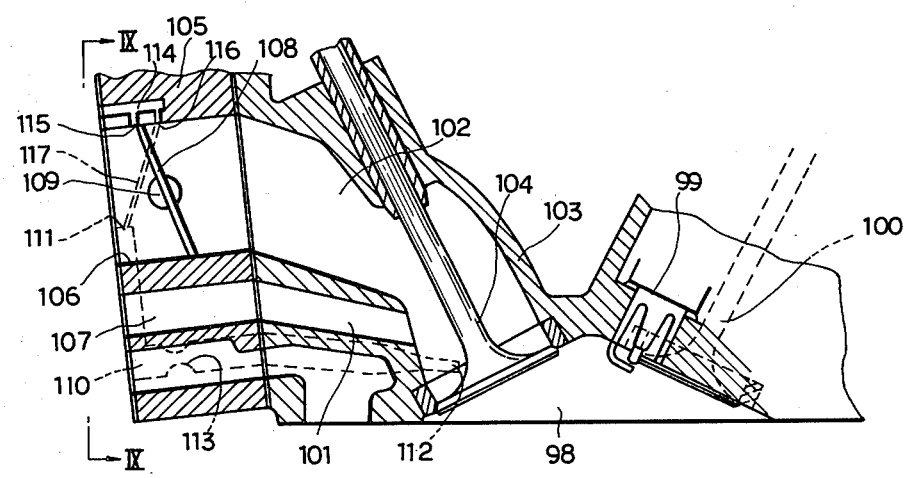
FIG. 8 is a fragmentary vertical cross-sectional view of an air-fuel mixture intake construction according to still another embodiment of the present invention.
Figure 9:
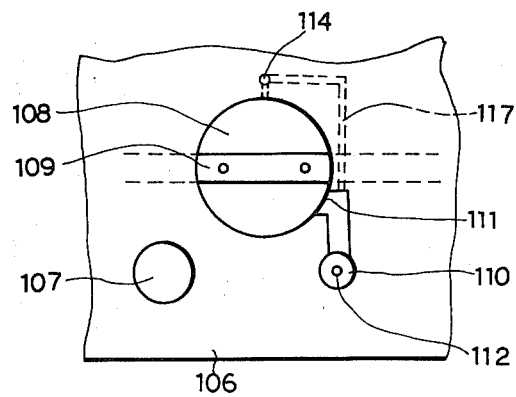
FIG. 9 is an elevational view taken along line IX-IX of FIG. 8.

According to still another embodiment of the present invention as shown in FIGS. 8 and 9, an internal combustion engine comprises a combustion chamber 98, a spark plug 99, an exhaust valve 100, a primary intake port 101 and a secondary intake port 102 which are defined in a cylinder head 103, and an intake valve 104 reciprocably mounted in the cylinder head 103 for opening and closing the secondary intake port 102 with respect to the combustion chamber 98. An adapter 105 by which an intake manifold (not shown) is attached to the cylinder head 103 has a primary intake passageway 106 and a secondary intake port 107 which are held in communication with the primary and secondary intake ports 101, 102, respectively. A secondary throttle valve 108 is supported on a throttle shaft 109 rotatably mounted in the adapter 105.

An induction passage or auxiliary intake passage 110 is defined jointly in the adapter 105 and the cylinder head 103. The induction passage 110 has an inlet end 111 opening into the secondary intake passageway 106 immediately upstream of the secondary throttle valve 108, and an outlet end 112 opening into the secondary intake port 103 immediately upstream of the intake valve 104 and directed tangentially to the circumference of the combustion chamber 98 toward the spark plug 99. The induction passage 110 also has a restrictor or orifice 113 between the inlet and outlet ends 111, 112. A secondary slow fuel supply passageway 114 extends into the adapter 105 and has a first or bypass port 115 opening into the secondary intake passageway 106 immediately upstream of the throttle valve 108 as it is fully closed, and a second or idle port 116 opening also into the secondary intake passageway 106 immediately downstream of the throttle valve 108 as fully closed. The idle port 116 is connected for fluid communication with the inlet end 111 of the induction passage 110 by a passageway 117 defined in the adapter 105.

When the engine operates in an idle mode or under light loads, an air-fuel mixture is supplied through the primary intake passageway 107 and the intake port 101 into the combustion chamber 98. At the same time, air or a lean air-fuel mixture is caused to flow from the secondary intake passageway 106 into the induction passage 110, from which it is ejected via the outlet end 112 rapidly into the combustion chamber 98 in which swirls are generated in the air-fuel mixture. A small amount of fuel is continuously supplied from the secondary slow fuel supply passageway 114 through the passageway 117 into the induction passage 110, thus preventing vapor lock which would otherwise take place when the fuel would be vaporized in the passageway 114 to block passage of fuel therethrough. When the secondary throttle valve 108 opens while the engine operates under medium and high loads, the fuel is immediately fed through the first port 115 into the secondary intake passageway 106. Thus, the engine is rendered highly responsive for smooth operation when the secondary fuel supply system comes into operation.

The amount of fuel supplied from the secondary slow fuel passageway 114 into the induction passage 110 is kept constant by the restrictor 113 which blocks pressure changes due to engine pulsations, maintaining a constant pressure in the induction passage 110 upstream of the restrictor 113. Thus, the restrictor 113 serves to supply a small amount of fuel at a stable rate for smooth engine operation in a range of small fuel consumption. Such stable fuel supply also assures correct fuel combustion control, improved fuel economy, and purification of the exhaust gas.

Although certain preferred embodiments have been shown and described in detail, it should be understood that various changes and modifications may be made therein without departing from the scope of the appended claims.

What is claimed is:

1. An air-fuel mixture intake construction for an internal combustion engine having at least one combustion chamber and an intake valve therefor, comprising:
a primary intake system having a primary venturi, a primary intake passage extending therefrom, and a primary throttle valve disposed therein for supplying an air-fuel mixture from said primary venturi through said primary intake passage into the combustion chamber under a full range of engine loads;
a secondary intake system having a secondary venturi, a secondary intake passage extending therefrom, and a secondary throttle valve disposed therein for supplying an air-fuel mixture from said secondary venturi through said secondary intake passage into the combustion chamber under medium and high engine loads, said secondary intake passage having an inner wall surface, said primary intake passage opening into said secondary intake passage adjacent to the intake valve; and
an induction passage having one end opening into said secondary intake passage upstream of said secondary throttle valve at a position spaced inwardly from said inner wall surface of said secondary intake passage, and the other end opening into said secondary intake passage immediately upstream of the intake valve.

2. An air-fuel mixture intake construction according to claim 1, wherein said induction passage includes a restricted portion associated therewith.

3. An air-fuel mixture intake construction according to claim 2, wherein said induction passage has a constricted nozzle at said other end which opens into said secondary intake passage immediately upstream of the intake valve, and said restricted portion being located upstream of said constricted nozzle.

4. An air-fuel mixture intake construction according to claim 3, wherein said secondary intake system includes a slow fuel supply passage.

5. An air-fuel mixture intake construction according to claim 4, including a passageway communicating between said slow fuel supply passage and said induction passage.

6. An air-fuel mixture intake construction according to claim 1, said induction passage comprising a pipe having an orifice in said one end and another pipe having a constricted nozzle in said other end.

7. An air-fuel mixture intake construction for an internal combustion engine having a plurality of combustion chambers and intake valves respectively therefor, comprising:
- a primary intake system having a primary venturi, primary intake passages extending therefrom, and a primary throttle valve for supplying an air-fuel mixture from said primary venturi through said primary intake passages into the combustion chambers under a full range of engine loads;
- a secondary intake system having a secondary venturi, secondary intake passages extending therefrom, and secondary throttle valves disposed respectively therein for supplying an air-fuel mixture from said secondary venturi through said secondary intake passages into the combustion chambers under medium and high engine loads, said secondary intake system including a plurality of slow fuel supply passages; and
- an induction passage system including a plurality of induction passages having distal ends opening respectively into said secondary intake passages adjacent to said intake valves, a common passage communicating with said primary intake passages immediately downstream of said primary throttle valve, said induction passages communicating at the other ends thereof with said common passage and with said secondary intake passages immediately upstream of said secondary throttle valves, said common passage being held in communication with said plurality of slow fuel supply passages.

8. An air-fuel mixture intake construction according to claim 7, wherein each of said induction passages comprises a pipe having a constricted nozzle in said distal end and another pipe communicating with said pipe and opening into one of said secondary intake passages immediately upstream of one of said secondary throttle valves.

9. An air-fuel mixture intake construction according to claim 7, including a passageway held in communication with said common passage and said primary intake passage immediately downstream of said primary throttle valve.

10. An air-fuel mixture intake construction according to claim 7, including a plurality of passageways held in communication with said common passage and said slow fuel supply passages, respectively.

11. An air-fuel mixture intake construction according to claim 7, wherein each said primary intake passage opens into a respective said secondary intake passage adjacent the respective intake valve.

12. An air-fuel mixture intake construction for an internal combustion engine having a combustion chamber and an intake valve therefor, comprising:
- a primary intake system having a primary venturi, a primary intake passage extending therefrom, and a primary throttle valve disposed therein for supplying an air-fuel mixture from said primary venturi through said primary intake passage into the combustion chamber under a full range of engine loads;
- a secondary intake system having a secondary venturi, a secondary intake passage extending therefrom, and a secondary throttle valve disposed therein for supplying an air-fuel mixture from said secondary venturi through said secondary intake passage into the combustion chamber under medium and high engine loads, said primary intake passage opening into said secondary intake passage adjacent to the intake valve, said secondary intake system including a slow fuel supply passage;
- an induction passage having one end opening into said secondary intake passage immediately upstream of said secondary throttle valve and the other end opening into said secondary intake passage immediately upstream of the intake valve, said induction passage including a restricted portion; and
- a passageway communicating between said slow fuel supply passage and said induction passage.

13. An air-fuel mixture intake construction according to claim 12, wherein said induction passage has a constricted nozzle in said other end, and wherein said restricted portion is spaced upstream from said constricted nozzle.

* * * * *